United States Patent
Ito

(10) Patent No.: US 11,658,698 B2
(45) Date of Patent: May 23, 2023

(54) WIRELESS COMMUNICATION DEVICE AND WIRELESS COMMUNICATION METHOD

(71) Applicant: Mitsubishi Electric Corporation, Tokyo (JP)

(72) Inventor: Naosuke Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 17/602,290

(22) PCT Filed: Apr. 23, 2019

(86) PCT No.: PCT/JP2019/017136
§ 371 (c)(1),
(2) Date: Oct. 8, 2021

(87) PCT Pub. No.: WO2020/217294
PCT Pub. Date: Oct. 29, 2020

(65) Prior Publication Data
US 2022/0190871 A1    Jun. 16, 2022

(51) Int. Cl.
*H04W 88/06* (2009.01)
*H04B 1/59* (2006.01)
(Continued)

(52) U.S. Cl.
CPC .............. *H04B 1/59* (2013.01); *H01Q 1/2241* (2013.01); *H04B 7/005* (2013.01)

(58) Field of Classification Search
CPC ........ H04B 1/59; H04B 7/005; H01Q 1/2241; B60C 23/0489; H04L 1/00
(Continued)

(56) References Cited

U.S. PATENT DOCUMENTS 7,039,436 B1 * 5/2006 Kakehi ................. H04B 7/022
455/503
2004/0246117 A1 12/2004 Ogawa et al.
(Continued)

FOREIGN PATENT DOCUMENTS

JP    2004-350119 A    12/2004
JP    2004-359119 A    12/2004
(Continued)

OTHER PUBLICATIONS

International Search Report and Written Opinion dated Jul. 9, 2019, received for PCT Application PCT/JP2019/017136, filed on Apr. 23, 2019, 8 pages including English Translation.

*Primary Examiner* — Tanmay K Shah
(74) *Attorney, Agent, or Firm* — Xsensus LLP

(57) ABSTRACT

A wireless communication device includes a transmitter that is provided in a rotary part of a rotary device and transmits a wireless signal; a receiver that is provided in a stationary part of the rotary device, receives the wireless signal, and calculates a communication quality level based on the wireless signal; and processing circuitry to determine a communication cycle based on the communication quality level so that the communication cycle synchronizes with a cycle as a multiple of a rotation cycle of the rotary part by an integer greater than or equal to 1, and to make timing of the communication between the transmitter and the receiver follow the rotation cycle by increasing or decreasing the communication cycle so that the communication quality level increases.

12 Claims, 7 Drawing Sheets

(51) Int. Cl.
  *H01Q 1/22*      (2006.01)
  *H04B 7/005*     (2006.01)
(58) Field of Classification Search
  USPC ...................................................... 455/552.1
  See application file for complete search history.

(56) References Cited

U.S. PATENT DOCUMENTS

2005/0110624 A1      5/2005  Nicot et al.
2014/0169501 A1*     6/2014  Nazarathy ........... H04L 27/2663
                                                 375/316
2014/0270030 A1*     9/2014  Hammad .............. H04L 7/0079
                                                 375/371

FOREIGN PATENT DOCUMENTS

JP      2005-158054 A         6/2005
JP      2005158054  A    *    6/2005    ......... B60C 23/0408
JP      2006-92355  A         4/2006

* cited by examiner

WIRELESS COMMUNICATION DEVICE AND WIRELESS COMMUNICATION METHOD

CROSS-REFERENCE TO RELATED APPLICATION

The present application is based on PCT filing PCT/JP2019/017136, filed Apr. 23, 2019, the entire contents of which are incorporated herein by reference.

TECHNICAL FIELD

The present invention relates to a wireless communication device and a wireless communication method.

BACKGROUND ART

There has been developed a wireless communication device that detects physical information such as temperature by using a sensor attached to a rotary part such as a rotor of a motor or a tire of a vehicle, transmits a wireless signal representing the physical information with a transmitter attached to the rotary part, and receives the wireless signal with a receiver attached to a stationary part such as a housing of the motor or a body of the vehicle. Patent Reference 1 proposes a wireless communication device that executes the wireless communication with communication timing corresponding to a rotational position of a wheel of a vehicle.

PRIOR ART REFERENCE

Patent Reference

Patent Reference 1: Japanese Patent Application Publication No. 2004-359119 (paragraph 0030, for example)

SUMMARY OF THE INVENTION

Problem to be Solved by the Invention

However, the device of the Patent Reference 1 requires to previously measure the relationship between the rotational position of the wheel and communication quality (e.g., reception level). Thus, when the rotational position optimum for the communication has changed due to a change in the revolution speed of the wheel, a change in the radio wave environment or the like, it is necessary to measure again the relationship between the rotational position of the wheel and the communication quality.

An object of the present invention is to provide a wireless communication device and a wireless communication method with which the communication between the rotary part and the stationary part can be adjusted to optimum timing.

Means for Solving the Problem

A wireless communication device according to an aspect of the present invention includes: a transmission unit that is provided in a rotary part of a rotary device and transmits a wireless signal; a reception unit that is provided in a stationary part of the rotary device, receives the wireless signal, and calculates a communication quality level based on the wireless signal; a communication cycle determination unit that determines a communication cycle based on the communication quality level so that the communication cycle synchronizes with a cycle as a multiple of a rotation cycle of the rotary part by an integer greater than or equal to 1; and a synchronization adjustment unit that makes timing of the communication between the transmission unit and the reception unit follow the rotation cycle by increasing or decreasing the communication cycle so that the communication quality level increases.

Effect of the Invention

According to the present invention, the communication between the rotary part and the stationary part can be adjusted to optimum timing.

MODE FOR CARRYING OUT THE INVENTION

A wireless communication device and a wireless communication method according to each embodiment of the present invention will be described below with reference to the drawings. The following embodiments are just examples and a variety of modifications are possible within the scope of the present invention.

(1) First Embodiment

(1-1) Configuration

Figure 1:
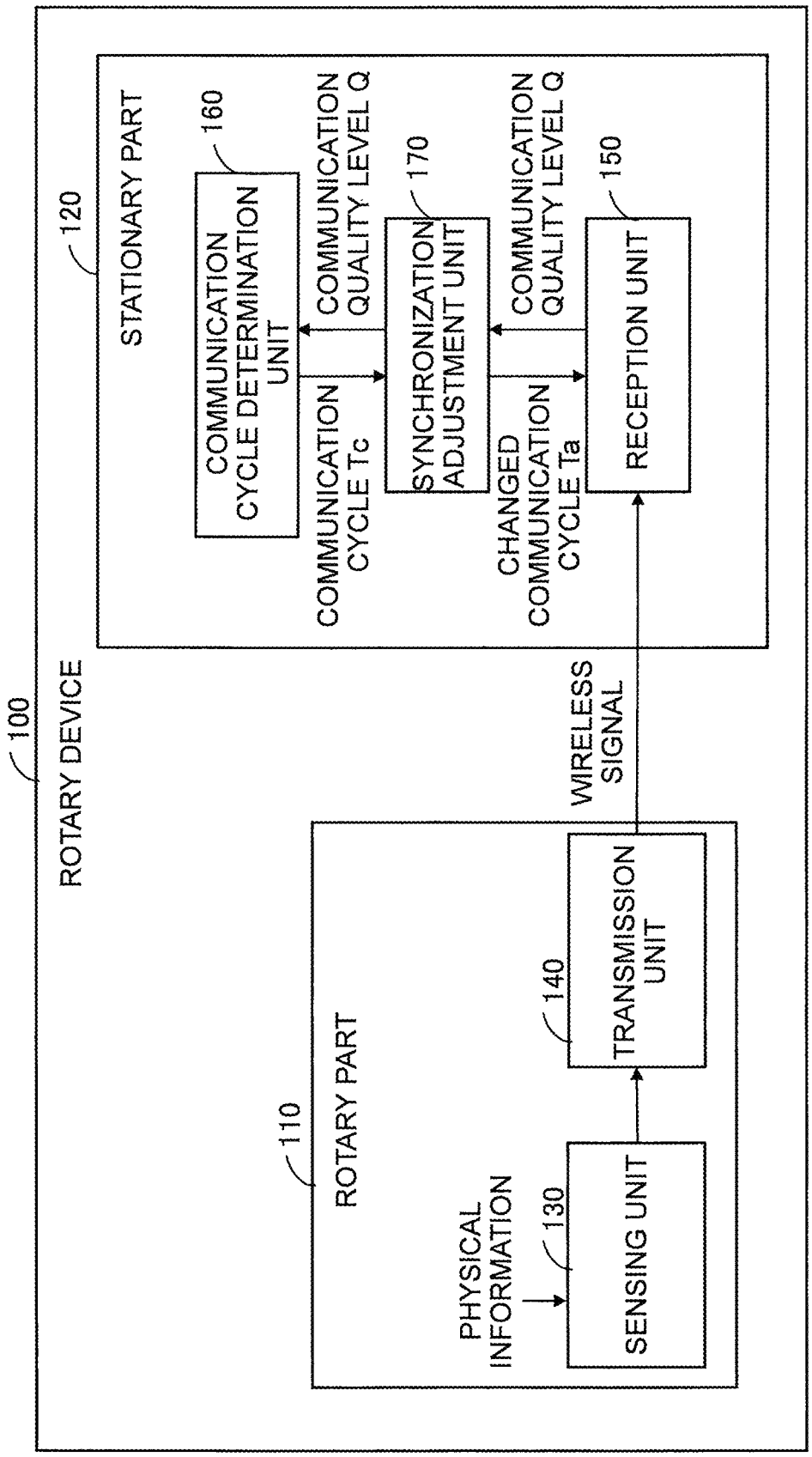
FIG. 1 is a block diagram schematically showing a configuration of a wireless communication device according to a first embodiment of the present invention.

FIG. 1 is a block diagram schematically showing a configuration of a wireless communication device according to a first embodiment. This wireless communication device is a device capable of executing a wireless communication method according to the first embodiment. The wireless communication device according to the first embodiment is provided in a rotary device 100 including a rotary part 110 and a stationary part 120. The rotary device 100 is a motor or the like, for example. In this case, the rotary part 110 is a rotor that rotates and the stationary part 120 is a housing including a stator.

The wireless communication device according to the first embodiment includes a sensing unit 130, a transmission unit 140 as a communication device, a reception unit 150 as a communication device, a communication cycle determination unit 160, and a synchronization adjustment unit 170. The sensing unit 130 and the transmission unit 140 are provided in the rotary part 110. The reception unit 150, the communication cycle determination unit 160 and the synchronization adjustment unit 170 are provided in the stationary part 120. However, the communication cycle determination unit 160 and the synchronization adjustment unit 170 do not necessarily have to be provided in the stationary part 120. The communication cycle determination unit 160 and the synchronization adjustment unit 170 may also be provided in a computer connected to the reception unit 150, a server communicatively connected to the reception unit 150 via a network, or the like.

The sensing unit 130 detects physical information. The sensing unit 130 is referred to also as a sensor. The transmission unit 140 is, for example, a transmitter that transmits a wireless signal indicating the physical information acquired by the sensing unit 130. In a case where the physical information acquired by the sensing unit 130 is temperature, the sensing unit 130 measures the temperature (e.g., temperature of a rotary shaft) by using a temperature sensor such as a thermocouple. The physical information measured by the sensing unit 130 can also be different information such as revolution speed, rotation angle acceleration, magnetic flux, vibration or acceleration of the rotary part 110 or voltage or current in wiring or a winding provided in the rotary part 110.

The rotary device 100 can also be a vehicle such as an automobile. In this case, the rotary part 110 is a wheel (or a tire) and the stationary part 120 is the body of the vehicle. In a case where the rotary device 100 is a helicopter, the rotary part 110 is a blade (i.e., rotor wing) and the stationary part 120 is the body of the helicopter. In a case where the rotary device 100 is an airplane, the rotary part 110 is a propeller and the stationary part 120 is the body of the airplane. In a case where the rotary device 100 is an air conditioner, the rotary part 110 is a fan and the stationary part 120 is the body of the air conditioner. However, the rotary device 100 is not limited to these examples.

The reception unit 150 includes a receiver that receives the wireless signal transmitted from the transmission unit 140. The reception unit 150 calculates a communication quality level Q, as an index representing communication quality, based on the wireless signal. The communication quality level Q calculated by the reception unit 150 is a value indicating how high the communication quality is. The communication quality level Q is, for example, reception intensity (RSSI: Received Signal Strength Indicator), the inverse number of the error rate, the signal-to-noise ratio (SNR: Signal Noise Ratio), or the like. A higher communication quality level Q means more excellent communication quality. However, the communication quality level Q is not limited to these examples.

The communication cycle determination unit 160 determines a communication cycle Tc based on the communication quality level Q so that the communication cycle Tc equals a cycle Trn (=N×Tr) [sec] as a multiple of a rotation cycle Tr [sec] of the rotary part 110 by an integer greater than or equal to 1 (i.e., N times the rotation cycle Tr). Namely, the communication cycle determination unit 160 determines the communication cycle Tc based on the communication quality level Q so as to satisfy Tc=Trn (=N×Tr). The rotation cycle Tr of the rotary part 110 is a time in which the rotary part 110 rotates once.

The synchronization adjustment unit 170 adjusts the timing of the communication between the transmission unit 140 and the reception unit 150 by increasing or decreasing the communication cycle Tc so that the communication quality level Q increases. Namely, the synchronization adjustment unit 170 changes (i.e., increases or decreases) the communication cycle Tc so that the communication quality level Q increases and thereby makes the communication cycle Ta after the change follow the rotation cycle Tr. Incidentally, the transmission of the wireless signal from the transmission unit 140 to the reception unit 150 is performed only for a certain short time at a certain cycle.

Figure 2:
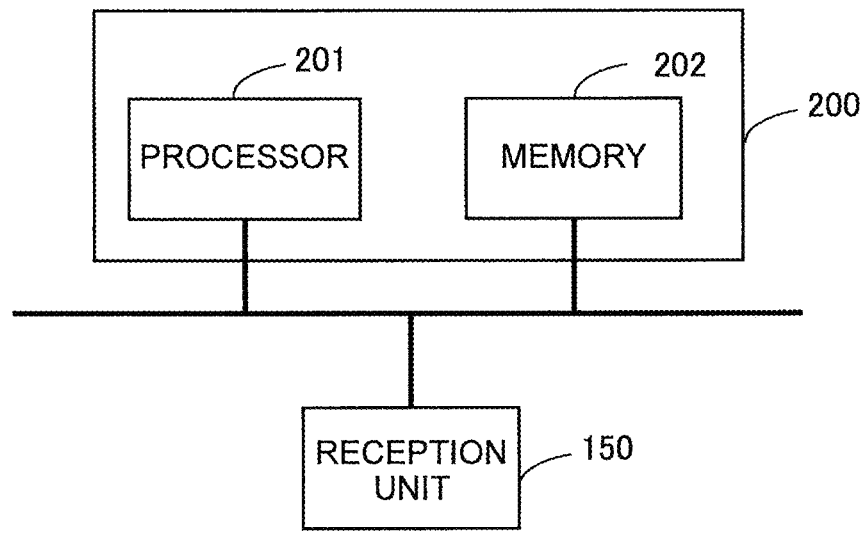
FIG. 2 is a diagram showing an example of the hardware configuration of the wireless communication device according to the first embodiment.

FIG. 2 is a diagram showing an example of the hardware configuration of the wireless communication device according to the first embodiment. FIG. 2 shows a configuration provided in the stationary part 120. As shown in FIG. 2, the wireless communication device includes a processor 201 as an information processing unit and a memory 202 as a storage unit for storing information. The processor 201 and the memory 202 execute operations performed in the communication cycle determination unit 160 and operations performed in the synchronization adjustment unit 170. The processor 201 and the memory 202 are, for example, part of a computer. A program has been installed in the memory 202. The program is installed via a network or from a storage medium storing information, for example. The program may include a program for executing a communication cycle determination process and a synchronization adjustment process which will be described later. The processor 201 executes processes on the stationary part 120's side of the wireless communication device by executing the program stored in the memory 202. The whole or part of the configuration on the stationary part 120's side of the wireless communication device may be formed with a control circuit made up of semiconductor integrated circuits. The memory 202 may include various types of storage devices such as a semiconductor storage device, a hard disk drive and a device that records information in a removable record medium.

Figure 3:
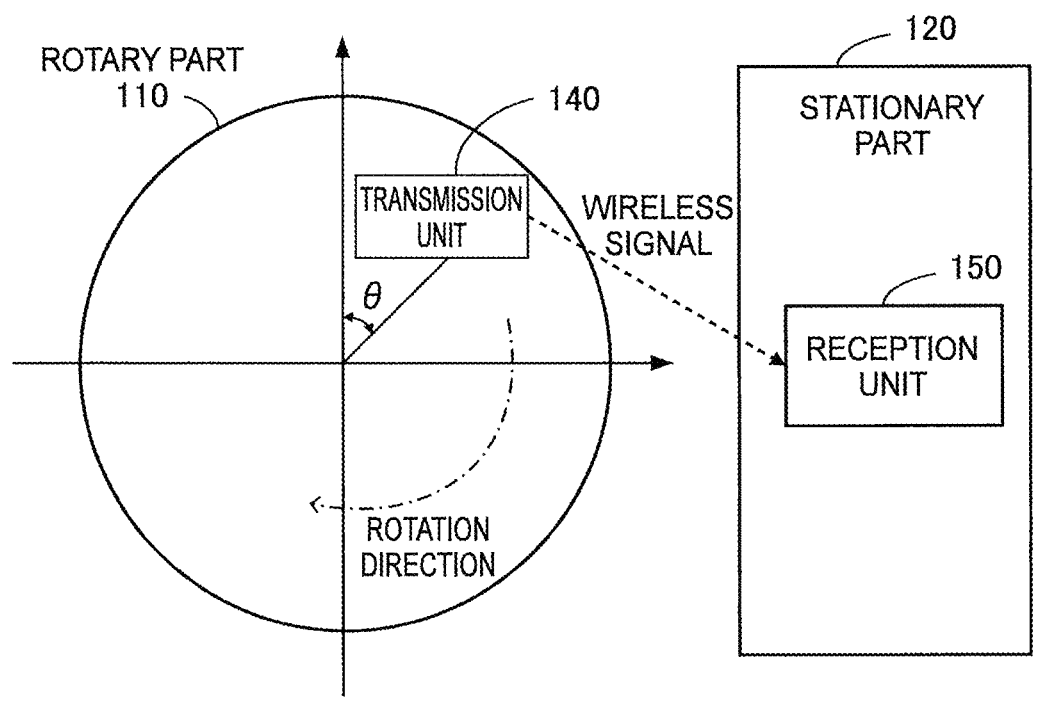
FIG. 3 is a schematic diagram showing a rotary part and a stationary part including the wireless communication device according to the first embodiment.

Next, a description will be given of a relationship between a rotation angle θ of the rotary part 110 and the communication quality level Q. FIG. 3 is a diagram showing a relationship between the rotation angle θ and the rotary part 110 and the stationary part 120 as viewed in a direction parallel to the rotary shaft. As shown in FIG. 3, the rotary part 110 rotates in a rotation direction around the rotary shaft. The stationary part 120 is arranged to face the rotary part 110 without contacting the rotary part 110, for example. A positional relationship between the transmission unit 140 and the reception unit 150 changes depending on the rotation angle θ. Thus, a propagation path of the wireless signal changes depending on the rotation angle θ, and the communication quality level Q fluctuates according to the change in the propagation path. Especially in a case where the rotary part 110 is a rotor of a motor, the revolution speed is high and thus the influence of the Doppler effect is significant compared to a case where the rotary part 110 is a tire of a vehicle. Further, in a case where the rotary part 110 is a rotor of a motor, the radio wave environment is likely to be influenced by an electromagnetic shielding effect and reflection by the metallic housing of the motor.

Figure 4:
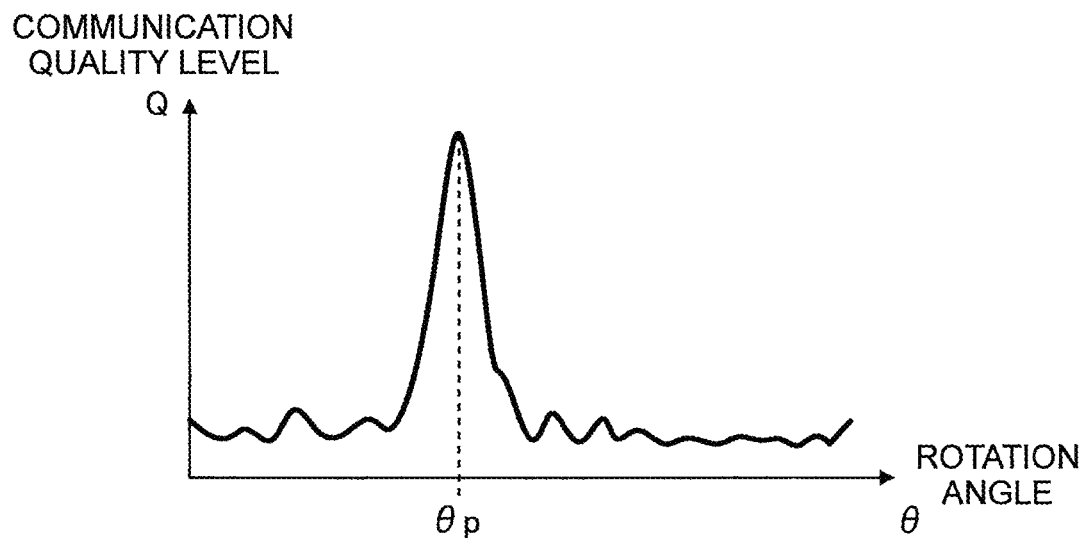
FIG. 4 is a graph showing a relationship between a rotation angle of the rotary part and a communication quality level calculated by a reception unit.

FIG. 4 is a graph showing a relationship between the rotation angle θ of the rotary part 110 and the communication quality level Q calculated by the reception unit 150. For example, as shown in FIG. 4, when the rotary part 110 rotates and the rotation angle θ changes, the communication quality level Q changes. By performing the communication between the transmission unit 140 and the reception unit 150 when the rotation angle θ is a rotation angle maximizing the communication quality level Q (i.e., rotation angle θ=θp), stability of the communication is increased.

Figure 5:
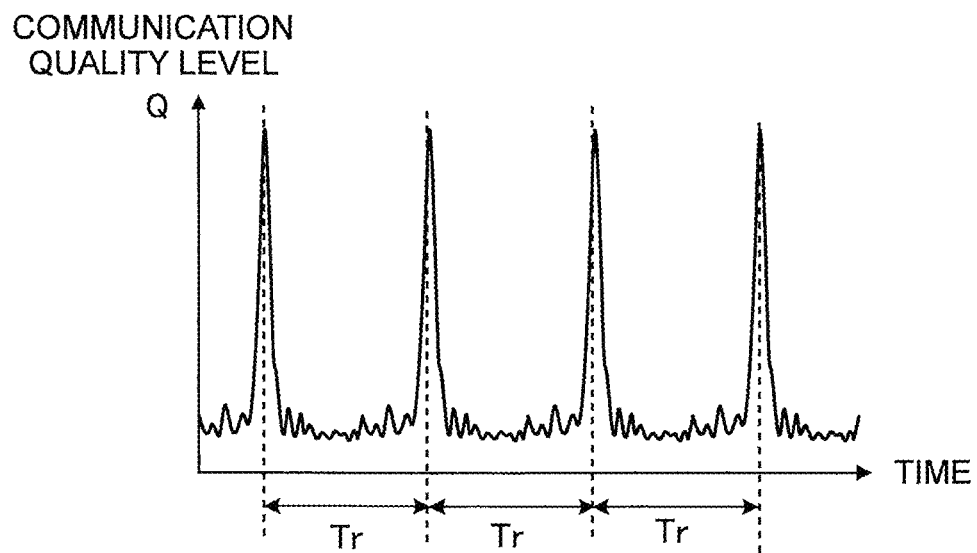
FIG. 5 is a graph showing a relationship between the time during the rotation of the rotary part and the communication quality level calculated by the reception unit.

FIG. 5 is a graph showing a relationship between the time during the rotation of the rotary part 110 and the communication quality level Q calculated by the reception unit 150. As is understandable from FIG. 5, the communication quality level Q fluctuates repeatedly at the rotation cycle Tr. The communication cycle determination unit 160 detects timing corresponding to the rotation angle θ maximizing the communication quality level Q, appearing at the rotation cycle Tr, as the communication timing.

As can be understood from FIG. 5, the communication cycle determination unit 160 is capable of estimating the rotation cycle Tr based on the fluctuation in the communication quality level Q. For example, the communication cycle determination unit 160 is capable of estimating the rotation cycle Tr by detecting peak intervals in the communication quality level Q. Further, the communication cycle determination unit 160 is capable of estimating the rotation cycle Tr by repeatedly detecting a signal by using autocorrelation processing. Furthermore, the communication cycle determination unit 160 is capable of estimating the rotation cycle Tr by calculating a frequency characteristic by using Fourier analysis. By performing Fourier analysis on the communication quality level Q, a characteristic in the frequency domain having a peak at the rotation cycle Tr is obtained. However, the method of estimating the rotation cycle Tr is not limited to these methods. Further, the communication cycle determination unit 160 can increase the accuracy by performing the estimation of the rotation cycle Tr more frequently than the determination of the communication timing.

The communication cycle determination unit 160 determines the communication cycle Tc by, for example, determining the communication timing as timing that is later than the timing with which the communication quality is the highest in the period of the rotation cycle Tr by the cycle Trn (=N×Tr) as a multiple of the rotation cycle Tr by an integer greater than or equal to 1 (i.e., N times the rotation cycle Tr). Namely, the communication cycle determination unit 160 determines the communication cycle Tc so that the communication cycle Tc equals the cycle Trn as a multiple of the rotation cycle Tr by an integer greater than or equal to 1. What multiple of the rotation cycle Tr the communication cycle Tc should be set at, namely, the value of N, is desired to be set as large as possible within a range in which the communication quality level Q can be acquired at satisfactory timing. With this setting, the time of the communication between the transmission unit 140 and the reception unit 150 becomes short and the power consumption in the transmission unit 140 can be held down. Further, in a case where a transmission unit other than the transmission unit 140 (i.e., another transmission unit) is provided in the rotary part 110, interference between a plurality of transmission units can be prevented by setting the value of N at a large value.

The synchronization adjustment unit 170 makes the communication timing follow the synchronization by calculating the influence of the increase or decrease in the communication cycle Tc on the increase or decrease in the communication quality level Q and increasing or decreasing the communication cycle Tc so that the communication quality level Q increases. Incidentally, when the synchronization adjustment unit 170 makes the communication timing follow the synchronization, the synchronization adjustment unit 170 does not increase or decrease the communication cycle Tc to a cycle Trn as an integral multiple of the rotation cycle Tr but increases or decreases the communication cycle Tc only by ΔTc, namely, changes the communication cycle Tc to Tc+ΔTc or Tc−ΔTc, to finely change the communication cycle Tc.

(1-2) Operation

Figure 6:
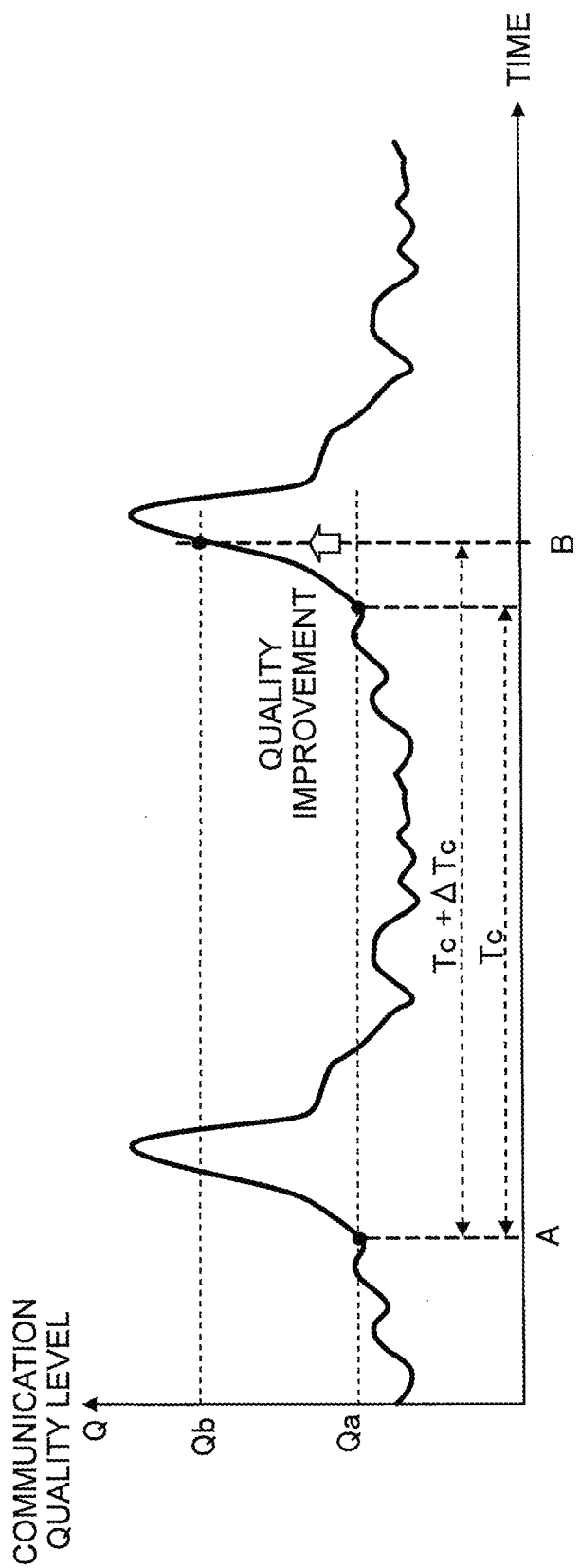
FIG. 6 is a graph showing a relationship between a communication cycle and the communication quality level.

FIG. 6 is a graph showing a relationship between the communication cycle and the communication quality level Q in the first embodiment. After completion of the communication cycle Tc determination process by the communication cycle determination unit 160, when a communication quality level Qa is acquired by executing the communication at certain communication timing A as timing earlier than timing at which the communication quality is expected to high, the synchronization adjustment unit 170 changes the communication cycle Tc to a longer communication cycle Tc+ΔTc, namely, a changed communication cycle Ta, so that the communication quality level Q increases to a higher communication quality level Qb. It can be understood that the communication quality at the next communication timing B is improved by this operation. Incidentally, after the communication quality has been improved, it is also possible for the synchronization adjustment unit 170 to return the communication cycle to the communication cycle Tc and adjust the communication timing.

Figure 7:
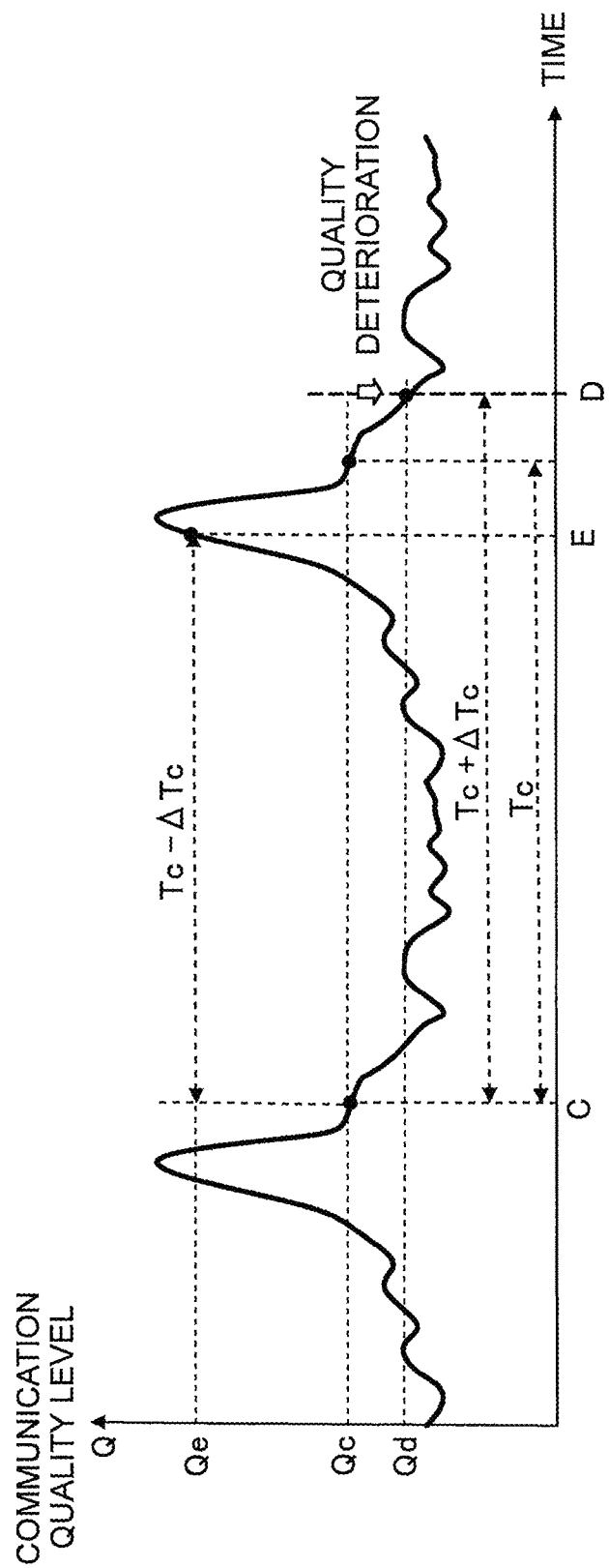
FIG. 7 is a graph showing a relationship between the communication cycle and the communication quality level.

FIG. 7 is a graph showing a relationship between the communication cycle and the communication quality level Q in the first embodiment. After completion of the communication cycle Tc determination process by the communication cycle determination unit 160, when a communication quality level Qc is acquired by executing the communication at certain communication timing C as timing later than timing at which the communication quality is expected to high, if the synchronization adjustment unit 170 changes the communication cycle Tc to a longer communication cycle Tc+ΔTc, the communication quality level drops to Qd and the communication quality deteriorates at the next communication timing D. When the communication quality deteriorates after changing the communication cycle Tc as above, the sign of a change amount of the communication cycle Tc is changed. Namely, when the communication quality level Qc is acquired by executing the communication at the certain communication timing C as timing later than timing at which the communication quality is expected to high, if the synchronization adjustment unit 170 changes the communication cycle Tc to a shorter communication cycle Tc−ΔTc, the communication quality level rises to Qe and the communication quality improves at the next communication timing E. By repeating these operations, or by repeating the process while changing the value of ΔQ, the synchronization adjustment unit 170 is capable of synchronizing the communication cycle with the rotation cycle Tr.

Incidentally, the communication cycle determination unit 160 may either constantly execute the operation of determining the communication cycle Tc or execute the operation of determining the communication cycle Tc at predetermined time intervals in order to reduce the computational load. For example, in a case where the rotation cycle Tr of the rotary part 110 is constant and invariable, it is possible to make the synchronization adjustment unit 170 operate so as to make the communication timing follow the rotation cycle Tr, without making the communication cycle determination unit 160 operate.

In a case where the rotation cycle Tr of the rotary part 110 changes, the communication cycle determination unit 160 executes the operation of determining the communication cycle Tc each time the rotation cycle Tr changes, and after the determination of the communication cycle Tc, the synchronization adjustment unit 170 operates so as to make the communication timing follow the rotation cycle Tr.

(1-3) Effect

As described above, with the wireless communication device according to the first embodiment, the stability of the communication can be increased by making the communication timing follow the optimum rotation angle θ.

Further, even in a case where the optimum rotational position fluctuates in an environment like a motor in which the revolution speed is high and the radio wave environment fluctuates due to reflection by metal, communication timing corresponding to the dynamically optimum rotational position can be determined and the stability of the communication can be increased.

Furthermore, in a case where autocorrelation processing or Fourier analysis is performed by the communication cycle determination unit 160, it is possible to make the communication timing follow the rotation cycle Tr of the rotary part 110 and increase the stability of the communication even in an environment in which the communication quality level Q is likely to fluctuate.

Moreover, since the wireless communication device according to the first embodiment does not include a means for detecting the rotation angle θ of the rotary part 110 (e.g., rotation angle sensor or rotation cycle sensor), it is possible to reduce the installation space and contribute to the downsizing of the configuration on the stationary part 120's side.

In addition, the accuracy of following the synchronization can be increased by making the synchronization adjustment unit 170 determine the direction of increasing/decreasing the communication cycle Tc based on the change in the measured communication quality level Q.

(2) Second Embodiment

A wireless communication device according to a second embodiment differs from the wireless communication device according to the first embodiment in that when the communication cycle Tc is greater than the rotation cycle Tr, the communication cycle determination unit 160 synchronizes the communication cycle with the cycle Trn as a multiple of the rotation cycle Tr by an integer greater than or equal to 1 based on an alias signal appearing according to the sampling theorem. The wireless communication device according to the second embodiment is the same as the wireless communication device according to the first embodiment except for the operation of the communication cycle determination unit 160. Thus, FIG. 1 to FIG. 3 will also be referred to in the following description of the second embodiment.

Figure 8:
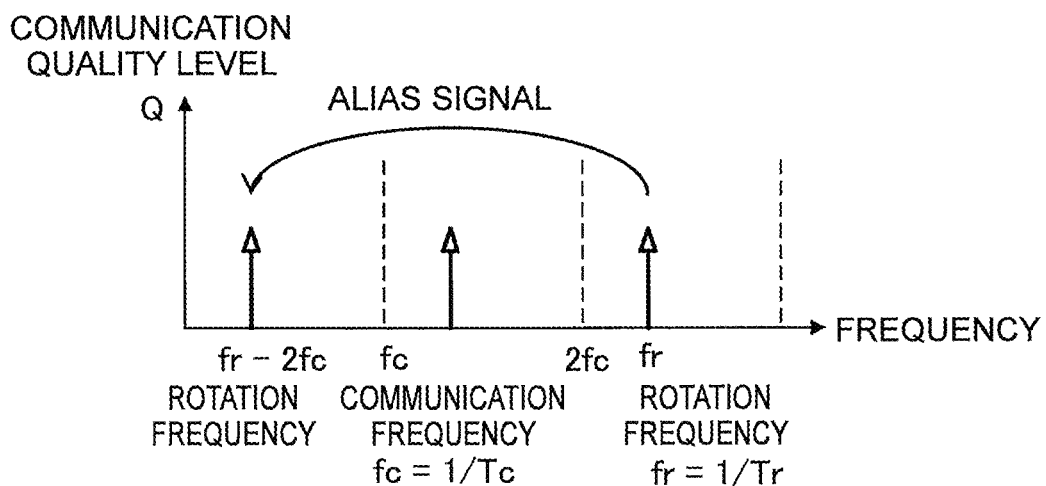
FIG. 8 is a graph showing a relationship between an alias signal and each frequency in a second embodiment of the present invention.
Figure 9:
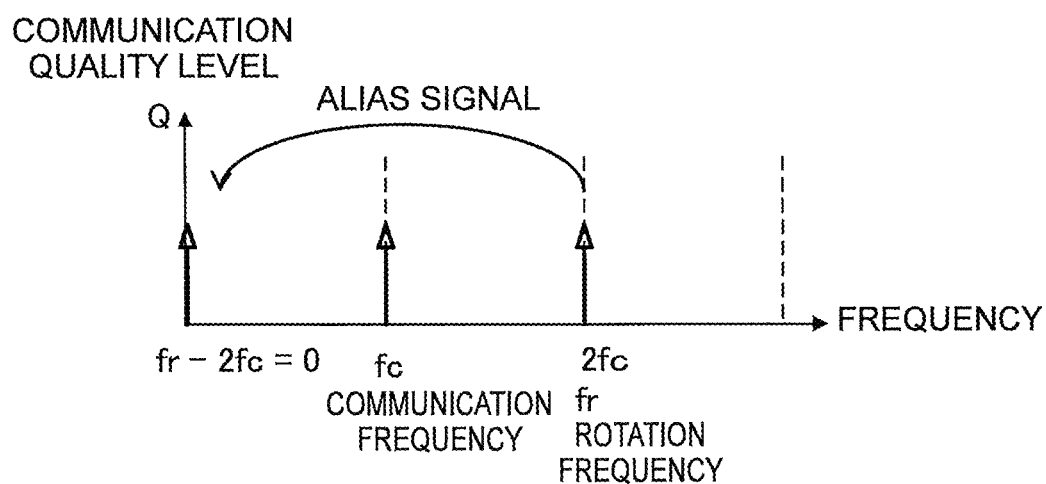
FIG. 9 is a graph showing a relationship between the alias signal and each frequency in the same period in the second embodiment.

FIG. 8 and FIG. 9 are diagrams showing examples of the frequency characteristic of the communication quality level Q. FIG. 8 and FIG. 9 show a relationship between the alias signal and each frequency in the form of graphs. By performing Fourier analysis on the communication quality level Q, a characteristic in the frequency domain having a peak at the rotation frequency fr is obtained. FIG. 8 clearly indicates a relationship among communication frequency fc (i.e., the inverse number of the communication cycle Tc), the rotation frequency fr (i.e., the inverse number of the rotation cycle Tr) and the alias signal of the rotation frequency fr in the frequency domain. In this case, if the rotation frequency fr is greater than the half of the communication frequency fc as the frequency of acquiring the communication quality level Q, the alias signal fa corresponding to the rotation frequency fr appears at fa=|fr−Nfc| (N: integer satisfying fr<fc/2) as shown in FIG. 8. Therefore, the rotation frequency fr (or the rotation cycle Tr) cannot be directly calculated from the detected alias signal fa and the synchronization cannot be established in a simple manner.

Here, in order to synchronize the communication cycle Tc with the cycle Trn as a multiple of the rotation cycle Tr by an integer greater than or equal to 1, the communication cycle determination unit 160 has only to change the communication frequency fc so that fa=0 is satisfied. FIG. 9 shows an example of the frequency characteristic of the communication quality level Q after the synchronization is established. Namely, the communication cycle determination unit 160 has only to change the communication frequency fc by Δfc so that |fr−N(fc+Δfc)|=0 is satisfied. Here, when N is unknown, the communication cycle determination unit 160 has only to obtain Δfc satisfying |fr−N(fc+Δfc)|=0 by repeating the changing of the communication frequency fc and the calculation of the frequency characteristic.

As described above, with the wireless communication device according to the second embodiment, by using the alias signal appearing according to the sampling theorem, the synchronization can be established even when the communication cycle Tc is long, that is, even when the acquisition frequency of the communication quality level Q is low. Accordingly, the wireless communication device is capable of establishing the synchronization even in an environment in which the rotation cycle Tr is short, that is, an environment in which the revolution speed is high, like a motor. Further, even in an environment in which the communication cycle Tc is long, that is, an environment in which the communication frequency is low, the wireless communication device is capable of establishing the synchronization and hold down the power consumption.

(3) Third Embodiment

A wireless communication device according to a third embodiment differs from the wireless communication device according to the first or second embodiment in that when the communication cycle Tc has become different from a predetermined communication cycle command value T0 by a predetermined threshold value Th or more, the synchronization adjustment unit 170 switches the communication cycle Tc to a cycle Trn as a multiple of the rotation cycle Tr by an integer greater than or equal to 1, different from the value set by the communication cycle determination unit 160, so as to bring the communication cycle Tc close to the communication cycle command value TO. The wireless communication device according to the third embodiment is the same as the wireless communication device according to the first or second embodiment except for the operation of the communication cycle determination unit. Thus, FIG. 1 to FIG. 3 will also be referred to in the following description of the third embodiment.

To make the communication cycle Tc follow the rotation cycle Tr, when the rotation cycle Tr changes, the synchronization adjustment unit 170 changes the communication cycle Tc according to the change in the rotation cycle Tr. In this case, when the rotation cycle Tr decreases (i.e., the rotation frequency fr increases) greatly, the communication will be performed more frequently than necessary. In contrast, when the rotation cycle Tr increases (i.e., the rotation frequency fr decreases) greatly, it becomes impossible to perform the communication with sufficient frequency.

To resolve this problem, in the wireless communication device according to the third embodiment, when the difference of the communication cycle Tc from the predetermined communication cycle command value TO has become the predetermined threshold value Th or more, the synchronization adjustment unit 170 switches the communication cycle Tc to a cycle Trn as a multiple of the rotation cycle Tr by an integer greater than or equal to 1, different from the value set by the communication cycle determination unit 160, so as to bring the communication cycle Tc close to the communication cycle command value TO. When the communication cycle Tc is greater than the rotation cycle Tr and N is unknown, the synchronization adjustment unit 170 changes the communication cycle Tc to a cycle Trn as an integral multiple or to a cycle obtained by division by an integer so as to bring the communication cycle Tc close to the communication cycle command value TO. Here, in the case of changing the communication cycle Tc to a cycle obtained by division by an integer, the synchronization can be lost, and thus the process by the communication cycle determination unit 160 has to be executed again.

As described above, with the wireless communication device according to the third embodiment, the communication can be performed at a cycle close to the communication cycle command value TO as the target.

(4) Fourth Embodiment

Figure 10:
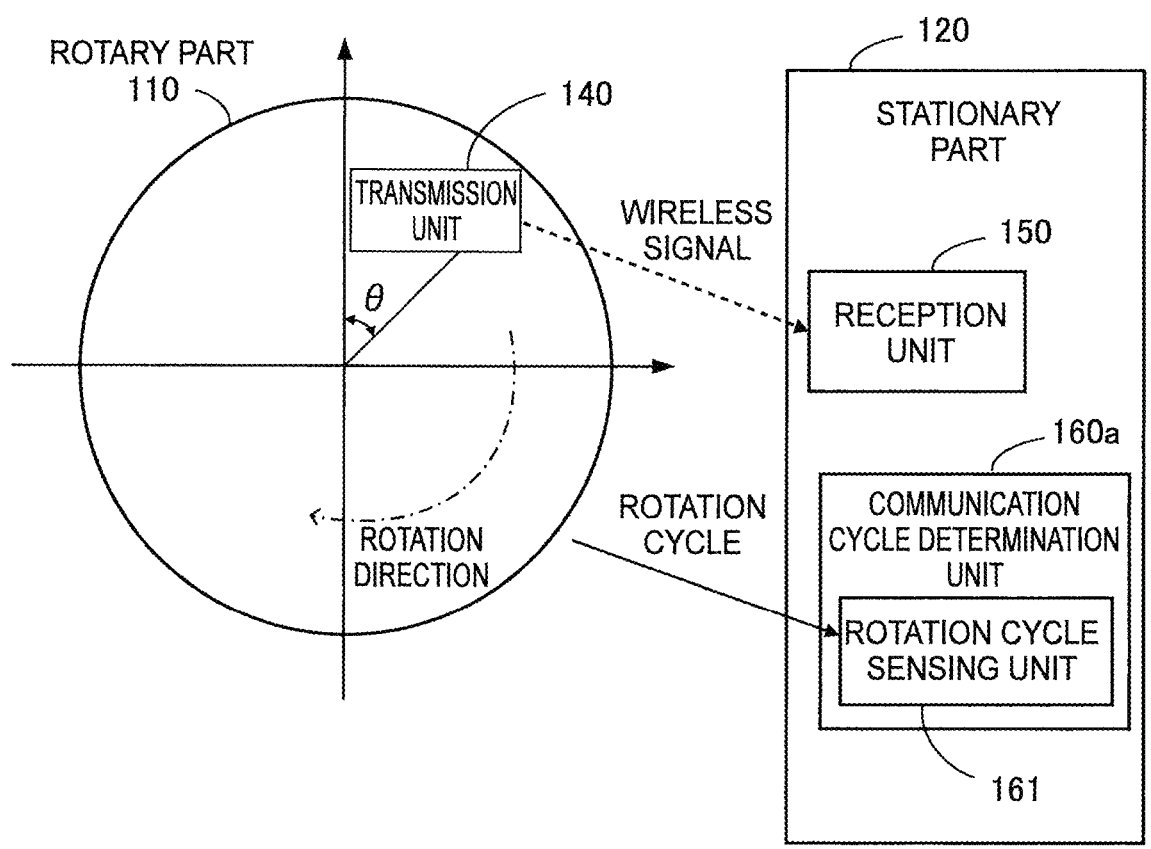
FIG. 10 is a schematic diagram showing a rotary part and a stationary part including a wireless communication device according to a fourth embodiment of the present invention.

FIG. 10 is a schematic diagram showing a rotary part 110 and a stationary part 120 including a wireless communication device according to a fourth embodiment. The wireless communication device according to the fourth embodiment differs from the wireless communication devices according to the first to third embodiments in that a communication cycle determination unit 160a includes a rotation cycle sensing unit 161 for sensing the rotation cycle Tr of the rotary part 110 and synchronizes the communication cycle Tc with the cycle Trn as a multiple of the rotation cycle Tr by an integer greater than or equal to 1. The wireless communication device according to the fourth embodiment is the same as the wireless communication devices according to the first to third embodiments except for the operation of the communication cycle determination unit 160a. Thus, FIG. 1 to FIG. 3 will also be referred to in the following description of the fourth embodiment.

As shown in FIG. 10, in the fourth embodiment, the rotation cycle Tr is acquired by using the rotation cycle sensing unit 161 and the communication cycle Tc is synchronized with the rotation cycle Tr. The rotation cycle sensing unit 161 is, for example, a magnetic revolution speed sensor, an optical revolution speed sensor or the like. Incidentally, the rotation cycle sensing unit 161 may also be provided outside the communication cycle determination unit 160a.

As described above, with the wireless communication device according to the fourth embodiment, by executing the synchronization process by using the rotation cycle Tr obtained by sensing, the communication cycle Tc and the rotation cycle Tr can be synchronized with high accuracy. Further, even in the case where the rotation cycle is directly sensed, the communication can be performed with appropriate timing with respect to the rotation angle by adjusting the communication cycle depending on the communication quality level.

Further, with the wireless communication device according to the fourth embodiment, the processing time can be reduced compared to the devices described in the first to third embodiments since the process of calculating the rotation cycle Tr is unnecessary.

(5) Modification

It is possible to appropriately combine the configurations of the wireless communication devices in the above first to fourth embodiments.

DESCRIPTION OF REFERENCE CHARACTERS

100: rotary device, 110: rotary part, 120: stationary part, 130: sensing unit, 140: transmission unit, 150: reception unit, 160, 160a: communication cycle determination unit, 161: rotation cycle sensing unit, 170: synchronization adjustment unit.

What is claimed is:

1. A wireless communication device comprising:
   a transmitter that is provided in a rotary part of a rotary device and transmits a wireless signal;
   a receiver that is provided in a stationary part of the rotary device, receives the wireless signal, and calculates a communication quality level based on the wireless signal; and
   processing circuitry
   to determine a communication cycle based on the communication quality level so that the communication cycle synchronizes with a cycle as a multiple of a rotation cycle of the rotary part by an integer greater than or equal to 1, and
   to make timing of the communication between the transmitter and the receiver follow the rotation cycle by increasing or decreasing the communication cycle so that the communication quality level increases,
   wherein when the communication cycle is greater than the rotation cycle, the processing circuitry synchronizes the communication cycle with the cycle as a multiple of the rotation cycle by an integer greater than or equal to 1 based on an alias signal appearing according to a sampling theorem.

2. The wireless communication device according to claim 1, further comprising a sensor that is provided in the rotary part and detects physical information,
   wherein the transmitter transmits the wireless signal representing the physical information.

3. The wireless communication device according to claim 1, wherein the processing circuitry increases or decreases the communication cycle so that the communication quality level increases based on a result of calculating influence of the increasing or decreasing of the communication cycle on the communication quality level.

4. The wireless communication device according to claim 1, further comprising a rotation cycle sensor that detects the rotation cycle of the rotary part,
   wherein the processing circuitry synchronizes the communication cycle with a cycle as a multiple of the rotation cycle detected by the rotation cycle sensor by an integer greater than or equal to 1.

5. The wireless communication device according to claim 1, wherein the rotary device is a motor.

6. A wireless communication device comprising:
   a transmitter that is provided in a rotary part of a rotary device and transmits a wireless signal;

a receiver that is provided in a stationary part of the rotary device, receives the wireless signal, and calculates a communication quality level based on the wireless signal; and processing circuitry to determine a communication cycle based on the communication quality level so that the communication cycle synchronizes with a cycle as a multiple of a rotation cycle of the rotary part by an integer greater than or equal to 1, and to make timing of the communication between the transmitter and the receiver follow the rotation cycle by increasing or decreasing the communication cycle so that the communication quality level increases, wherein when the communication cycle has become different from a predetermined communication cycle command value by a predetermined threshold value or more, the processing circuitry switches the communication cycle to a cycle as a multiple of the rotation cycle by an integer greater than or equal to 1, different from the value set by the processing circuitry, so as to bring the communication cycle close to the communication cycle command value.

7. A wireless communication device comprising:

a transmitter that is provided in a rotary part of a rotary device and transmits a wireless signal;

a receiver that is provided in a stationary part of the rotary device, receives the wireless signal, and calculates a communication quality level based on the wireless signal; and processing circuitry to determine a communication cycle based on the communication quality level so that the communication cycle synchronizes with a cycle as a multiple of a rotation cycle of the rotary part by an integer greater than or equal to 1, and to make timing of the communication between the transmitter and the receiver follow the rotation cycle by increasing or decreasing the communication cycle so that the communication quality level increases, processing circuitry calculates a relationship between the communication cycle and the rotation cycle by performing autocorrelation processing on the communication quality levels obtained by using a fixed communication cycle for a predetermined period and thereby synchronizes the communication cycle with a cycle as a multiple of the rotation cycle by an integer greater than or equal to 1.

8. A wireless communication device comprising:

a transmitter that is provided in a rotary part of a rotary device and transmits a wireless signal;

a receiver that is provided in a stationary part of the rotary device, receives the wireless signal, and calculates a communication quality level based on the wireless signal; and processing circuitry to determine a communication cycle based on the communication quality level so that the communication cycle synchronizes with a cycle as a multiple of a rotation cycle of the rotary part by an integer greater than or equal to 1, and to make timing of the communication between the transmitter and the receiver follow the rotation cycle by increasing or decreasing the communication cycle so that the communication quality level increases, wherein the processing circuitry calculates a relationship between the communication cycle and the rotation cycle by performing Fourier analysis on the communication quality levels obtained by using a fixed communication cycle for a predetermined period and thereby synchronizes the communication cycle with a cycle as a multiple of the rotation cycle by an integer greater than or equal to 1.

9. A wireless communication method of receiving a wireless signal transmitted from a transmitter provided in a rotary part of a rotary device, comprising:

calculating a communication quality level based on the wireless signal;

determining a communication cycle based on the communication quality level so that the communication cycle synchronizes with a cycle as a multiple of a rotation cycle of the rotary part by an integer greater than or equal to 1; and making timing of the communication with the transmitter follow the rotation cycle by increasing or decreasing the communication cycle so that the communication quality level increases, wherein in determining the communication cycle, when the communication cycle is greater than the rotation cycle, the communication cycle is synchronized with the cycle as a multiple of the rotation cycle by an integer greater than or equal to 1 based on an alias signal appearing according to a sampling theorem.

10. A wireless communication method of receiving a wireless signal transmitted from a transmitter provided in a rotary part of a rotary device, comprising:

calculating a communication quality level based on the wireless signal;

determining a communication cycle based on the communication quality level so that the communication cycle synchronizes with a cycle as a multiple of a rotation cycle of the rotary part by an integer greater than or equal to 1; and making timing of the communication with the transmitter follow the rotation cycle by increasing or decreasing the communication cycle so that the communication quality level increases, wherein in making the timing follow the rotation cycle, when the communication cycle has become different from a predetermined communication cycle command value by a predetermined threshold value or more, the communication cycle is switched to a cycle as a multiple of the rotation cycle by an integer greater than or equal to 1, different from the value set in the step of determining the communication cycle, so as to bring the communication cycle close to the communication cycle command value.

11. A wireless communication method of receiving a wireless signal transmitted from a transmitter provided in a rotary part of a rotary device, comprising:

calculating a communication quality level based on the wireless signal;

determining a communication cycle based on the communication quality level so that the communication cycle synchronizes with a cycle as a multiple of a rotation cycle of the rotary part by an integer greater than or equal to 1; and making timing of the communication with the transmitter follow the rotation cycle by increasing or decreasing the communication cycle so that the communication quality level increases, wherein in determining the communication cycle, a relationship between the communication cycle and the rotation cycle is calculated by performing autocorrelation processing on the communication quality levels obtained by using a fixed communication cycle for a predetermined period and thereby synchronizes the communication cycle with a cycle as a multiple of the rotation cycle by an integer greater than or equal to 1.

12. A wireless communication method of receiving a wireless signal transmitted from a transmitter provided in a rotary part of a rotary device, comprising:

calculating a communication quality level based on the wireless signal;

determining a communication cycle based on the communication quality level so that the communication cycle synchronizes with a cycle as a multiple of a rotation cycle of the rotary part by an integer greater than or equal to 1; and making timing of the communication with the transmitter follow the rotation cycle by increasing or decreasing the communication cycle so that the communication quality level increases, wherein in determining the communication cycle, a relationship between the communication cycle and the rotation cycle is calculated by performing Fourier analysis on the communication quality levels obtained by using a fixed communication cycle for a predetermined period and thereby synchronizes the communication cycle with a cycle as a multiple of the rotation cycle by an integer greater than or equal to 1.

* * * * *